United States Patent
Duell et al.

(10) Patent No.: US 9,667,068 B2
(45) Date of Patent: May 30, 2017

(54) SYSTEM, METHOD, AND COMPUTER PROGRAM PRODUCT FOR A SWITCH MODE CURRENT BALANCING RAIL MERGE CIRCUIT

(71) Applicant: NVIDIA CORPORATION, Santa Clara, CA (US)

(72) Inventors: Samuel Richard Duell, San Jose, CA (US); Gabriele Gorla, Santa Clara, CA (US); Yaoshun Jia, Milpitas, CA (US); Qi Lin, San Jose, CA (US); Andrew Bell, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 633 days.

(21) Appl. No.: 14/133,516

(22) Filed: Dec. 18, 2013

(65) Prior Publication Data

US 2015/0171631 A1  Jun. 18, 2015

(51) Int. Cl.
| | | |
|---|---|---|
| *H02J 1/00* | (2006.01) | |
| *H02J 3/00* | (2006.01) | |
| *H02J 3/46* | (2006.01) | |
| *H02J 4/00* | (2006.01) | |
| *G06F 1/26* | (2006.01) | |

(52) U.S. Cl.
CPC *H02J 3/46* (2013.01); *H02J 4/00* (2013.01); *G06F 1/26* (2013.01); *Y10T 307/696* (2015.04)

(58) Field of Classification Search
CPC ...... G06F 1/28; G06F 1/26; G06F 1/00; H02J 9/061; H02J 1/10

USPC ........ 307/80, 82, 66, 64, 43; 326/30, 62, 31, 326/17, 29; 713/300, 324, 340, 323, 330; 340/538
See application file for complete search history.

(56) References Cited

U.S. PATENT DOCUMENTS

| | | | | |
|---|---|---|---|---|
| 6,523,128 | B1 * | 2/2003 | Stapleton | G06F 1/3203 713/324 |
| 7,724,069 | B1 * | 5/2010 | Webb | H03K 17/145 327/404 |
| 2008/0238655 | A1 * | 10/2008 | McShane | G06F 1/32 340/538 |
| 2008/0278984 | A1 * | 11/2008 | Stanley | H02M 7/48 363/95 |
| 2013/0320769 | A1 * | 12/2013 | Sawyers | G06F 1/263 307/80 |
| 2014/0192583 | A1 * | 7/2014 | Rajan | G11C 7/10 365/63 |
| 2014/0266832 | A1 * | 9/2014 | Schrom | H02M 3/157 341/144 |

FOREIGN PATENT DOCUMENTS

GB      247864 A  *  5/2011  ............... G06F 1/26

* cited by examiner

*Primary Examiner* — Rexford Barnie
*Assistant Examiner* — Jagdeep Dhillon
(74) *Attorney, Agent, or Firm* — Zilka-Kotab, PC

(57) ABSTRACT

A system, method, and computer program product are provided for merging two or more supply rails into a merged supply rail. The method comprises receiving two or more current measurement signals associated with two or more supply rails, selecting one supply rail from the two or more supply rails, based on the current measurement signals, and enabling the selected supply rail to source current into a merged supply rail.

21 Claims, 17 Drawing Sheets

SYSTEM, METHOD, AND COMPUTER PROGRAM PRODUCT FOR A SWITCH MODE CURRENT BALANCING RAIL MERGE CIRCUIT

FIELD OF THE INVENTION

The present invention relates to power supply systems, and more specifically to switch mode current balancing.

BACKGROUND

A power supply subsystem may receive electrical energy through two or more supply rails, each specified to safely provide a maximum average current. The power supply subsystem may transform the electrical energy to power a set of regulated voltage rails used by an associated load circuit. One reason to deliver the electrical energy through multiple supply rails is to supply more total power to the load circuit than one supply rail is conventionally configured to provide. As the load circuit increases power consumption, current may increase in one or more of the supply rails. Under certain loading conditions, a conventional power supply subsystem may draw more current from one supply rail than other supply rails, leading to inefficient utilization of potentially available current. In certain scenarios, the load circuit may attempt to demand peak power that the two or more supply rails could ideally provide, however the power supply subsystem may not actually be able to supply the peak power because of inefficient utilization. In such scenarios, the load circuit may not be able to achieve proper peak performance levels because the load circuit may be forced to operate in a lower power, lower performance mode to avoid exceeding maximum supply rail specifications.

In certain configurations, each of the two or more supply rails needs to be considered as distinct and independent from the other supply rails. As a consequence, arbitrary power-on and power-off sequencing of the supply rails needs to be accommodated by the power supply subsystem and the load circuit, both of which may be required to implement additional power-on states representing suboptimal operating modes. Thus, there is a need for addressing this issue and/or other issues associated with the prior art.

SUMMARY

A system, method, and computer program product are provided for merging two or more supply rails into a merged supply rail. The method comprises receiving two or more current measurement signals that are associated with two or more supply rails, selecting one supply rail from the two or more supply rails, based on the current measurement signals, and enabling the selected supply rail to source current into a merged supply rail.

DETAILED DESCRIPTION

Figure 1A:
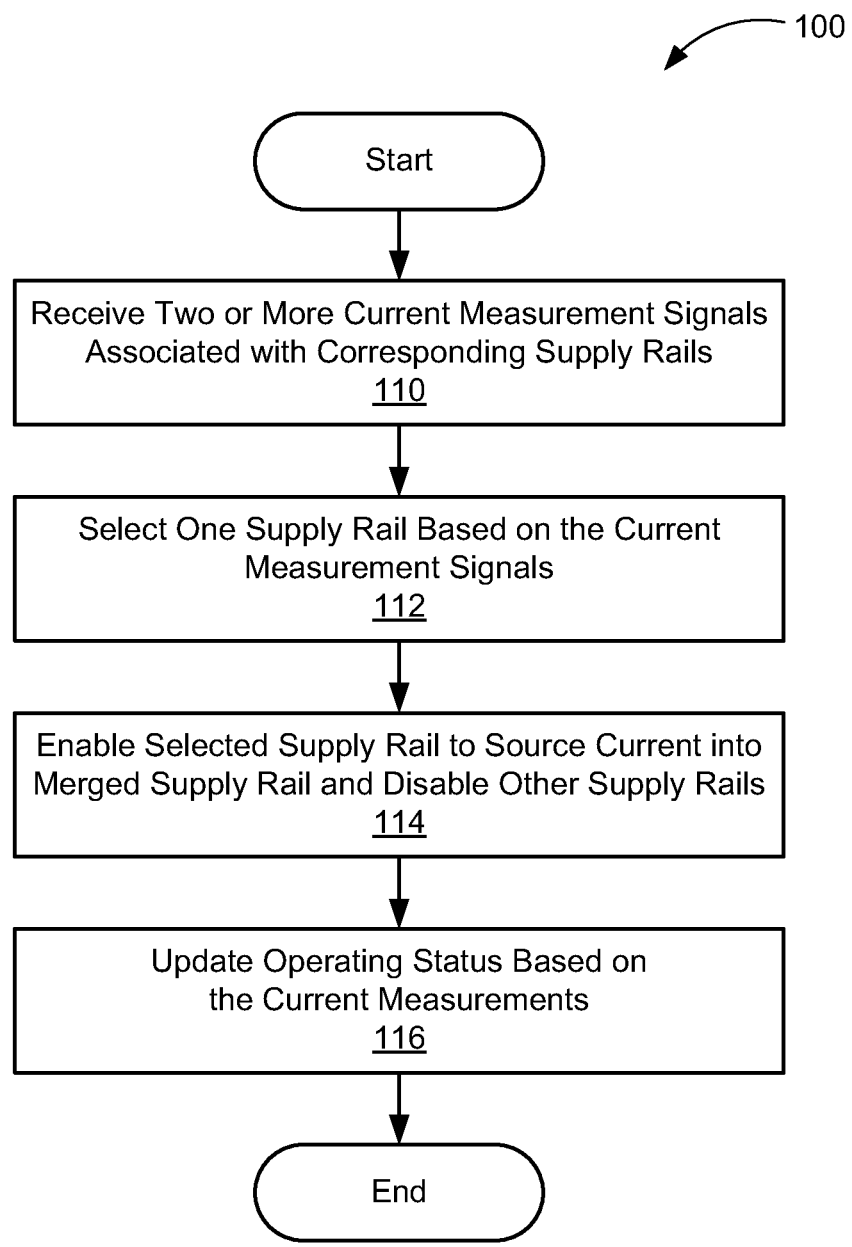
FIG. 1A illustrates a flow chart of a method for switching supply current into a merge node, in accordance with one embodiment.

A technique is provided for combining electrical energy sourced from a multi-output power supply circuit configured to provide two or more supply rails into a single merged supply rail. Each of the two or more supply rails is configured to supply electrical current at a nominally identical voltage with respect to a common ground node. A switch mode current balancing rail merge circuit draws current from each of the two or more supply rails according to a predetermined current ratio by sequentially selecting one of the two or more supply rails to source current to the merged supply rail. Instantaneous current sourced from the one selected supply rail may exceed a specified maximum average current; however, such transient currents are averaged with substantially no current whenever a different supply rail is selected. As a consequence, average current from each of the two or more supply rails may remain at or below a corresponding specified maximum average current.

The merged supply rail is able to source an average current to a load circuit, where the average current is a sum of average currents provided by each of the two or more supply rails. For example, a multi-output power supply circuit may provide three twelve-volt supply rails, each configured to provide up to ten amperes. In this example, the switch mode current balancing rail merge circuit receives current from the three independent rails and provides a single merged supply rail capable of providing up to thirty amperes at twelve volts.

In a first embodiment, balancing the average current sourced from each of the two or more supply rails is achieved by adjusting relative duty cycles associated with each supply rail sourcing current to the merged supply rail within one switching cycle. A switching cycle comprises sequentially selecting one of each of the two or more supply rails to source current to the merged supply rail. Each of the two or more supply rails may be selected once within a switching cycle. In certain embodiments, one switching cycle is completed within a fixed duration, and sequential switching cycles are completed at a fixed frequency. A duty cycle of a given supply rail that is temporarily sourcing more current than an average current sourced by the two or more supply rails is reduced in sequential switching cycles, thereby causing the supply rail to source less average current per switching cycle and consequently causing the other supply rails to source more current per switching cycle. Each supply rail duty cycle may be proportionally adjusted relative to the average current sourced to achieve an overall balanced average current over the two or more supply rails. As average current consumption increases for the load circuit, average current supplied by each of the two or more supply rails proportionately increases.

In a second embodiment, balancing average current sourced from each of the two or more supply rails is achieved by adjusting a duration associated with each supply rail sourcing current to the merged supply rail. Within one switching cycle, a substantially constant charge from each supply rail is transferred to the merged supply rail. A switching cycle comprises sequentially selecting one of each of the two or more supply rails to source current to the merged supply rail. Each of the two or more supply rails may be selected once within a switching cycle. In certain embodiments, one switching cycle is completed within a variable duration, and sequential switching cycles are completed at a variable frequency. The variable duration may be inversely proportional to average current being sourced to the merged supply rail. A sufficiently small quantity of charge should be transferred to ensure that each supply rail is able to supply a sufficient transient current, which may be larger than a corresponding maximum average current.

The technique may be implemented using a variety of different circuits. For example, a circuit that implements the first embodiment summarized above is described below in FIG. 4A, while a circuit that implements the second embodiment summarized above is described below in FIG. 5A. These circuits implement the technique directly using functional circuit elements. Furthermore, either or both embodiments may be implemented by an embedded processor configured execute instructions stored within non-transitory computer readable medium. The instructions may direct the embedded processor to measure current being sourced by each of the two or more supply rails and to select a supply rail to source current into the merged supply rail. The embedded processor may perform current integration, or sample an integrated current value from an integrator circuit configured to measure and integrate current being sourced by each of the two or more supply rails. In certain embodiments, signals are represented as analog voltages or analog currents. In other embodiments, such as embodiments implemented using an embedded processor, certain signals are represented as sequential digital values.

Embodiments of the present invention are described herein with respect to positive-polarity supply rails; however, systems having negative polarity supply rails may be implemented using techniques taught herein without departing the scope and spirit of the present invention.

FIG. 1A illustrates a flow chart of a method 100 for combining electrical energy sourced from two or more supply rails into a single merged supply rail, in accordance with one embodiment. Although method 100 is described in the context of certain circuit and system implementations described in FIGS. 2, 3, 4A, 5A, 5B, and 5C, the method 100 may also be performed by a program, other custom circuitry, or by a combination of custom circuitry and a program. Furthermore, persons of ordinary skill in the art will understand that any system that performs method 100 is within the scope and spirit of embodiments of the present invention. In one embodiment, method 100 is performed by the circuit of FIGS. 2, 3, and 4A. In another embodiment, method 100 is performed by the circuit of FIGS. 2, 3, 5A, 5B, and 5C. In general, method 100 is performed by a rail merge circuit, such as switch mode current balancing rail merge circuit 220. In one embodiment, method 100 is repeated during normal operation of the rail merge circuit.

Method 100 begins in step 110, where the rail merge circuit receives two or more current measurements associated with corresponding supply rails. In one embodiment, each of the current measurement signals comprises a substantially instantaneous measure of current being sourced by a corresponding supply rail. In another embodiment, each of the current measurement signals comprises a substantially instantaneous integral of current being sourced by a corresponding supply rail. The rail merge circuit may receive the two or more current measurement signals from independent current measurement circuits implemented external to the rail merge circuit, or the rail merge circuit may include the current measurement circuits. In step 112, the rail merge circuit selects one supply rail from the two or more supply rails, based on the current measurement signals. In one embodiment, step 112 is implemented according to method 102 of FIG. 1B. In another embodiment, step 112 is implemented according to method 104 of FIG. 1C.

In step 114, the rail merge circuit enables the selected supply rail to source current to the merged supply rail. In one embodiment, enabling the selected supply rail comprises turning on a switch coupled between the selected supply rail and the merged supply rail, while turning off other switches coupled between other supply rails and the merged supply rail. Each switch may comprise any technically feasible switching device, such as a field-effect transistor (FET), configured to operate in accordance with electrical requirements of the rail merge circuit. For example, if the rail merge circuit is configured to receive up to an average of ten amperes per supply rail, with fifty ampere transient current, then the switch should be configured to transmit at least ten amperes and reliably tolerate transmitting up to at least a fifty ampere transient current. In one implementation, each FET comprises a p-channel metal-oxide FET (P-FET). In a different implementation, each FET comprises an n-channel FET (N-FET).

In step 116, the rail merge circuit updates an operating status based on the current measurement signals. The operating status may include, without limitation, one or more indications that one or more supply rails are sourcing more than a specified threshold of average current, one or more supply rails are sourcing more than specified threshold of instantaneous current, or any combination thereof. Furthermore, one or more thresholds may be specified and indicated by the operating status. In one embodiment, each of the two or more supply rails has an associated threshold defined as a maximum average current. An additional threshold may include current being sourced from the merged supply rail to the load circuit. In one embodiment, updating the operating status comprises notifying the load circuit that a threshold, such as a maximum average current, is being exceeded. The load circuit should then reduce power consumption to bring maximum average current back to a sustainable level.

Figure 1B:
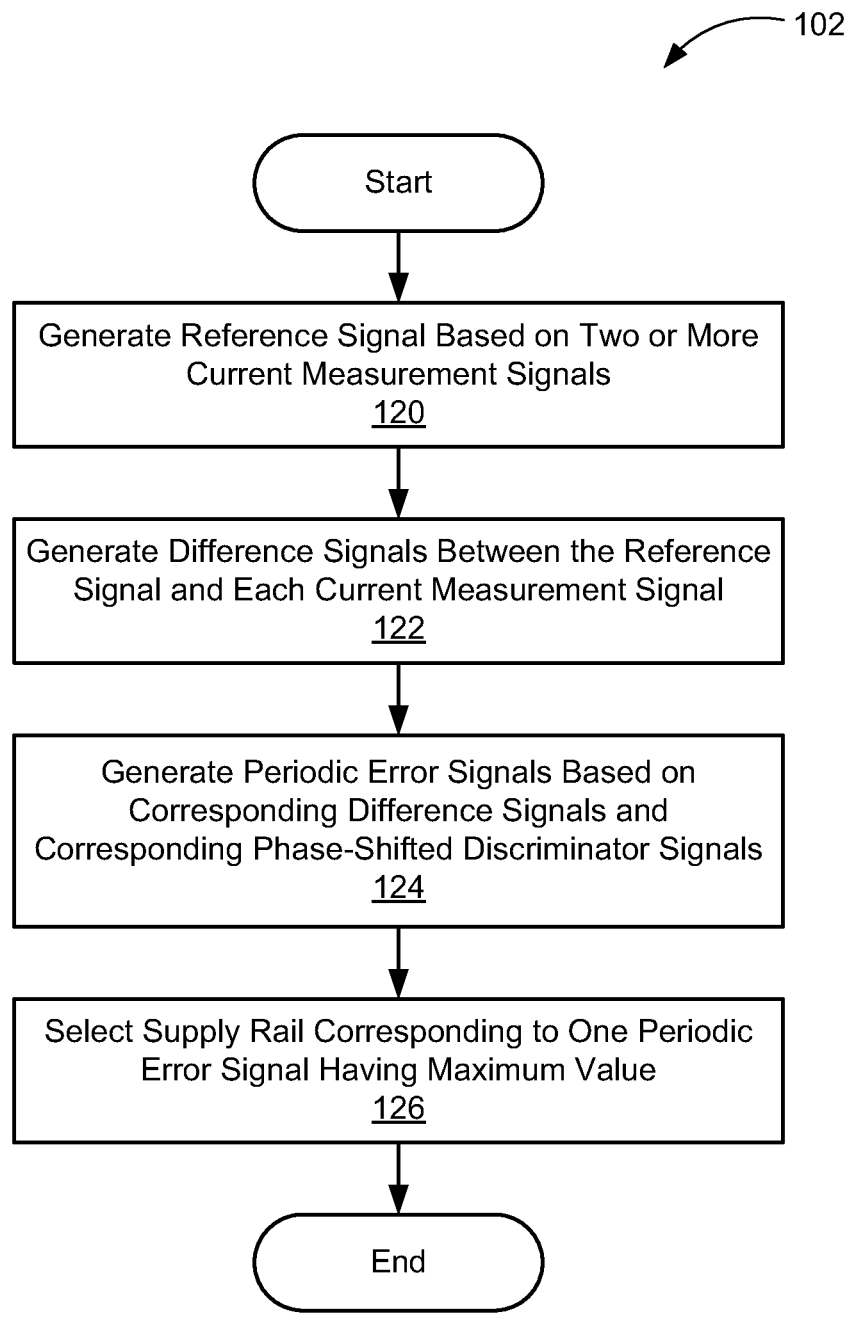
FIG. 1B illustrates a flow chart of a method for selecting one supply rail based on two or more current measurement signals, in accordance with a first embodiment.

FIG. 1B illustrates a flow chart of a method 102 for selecting one supply rail based on two or more current measurement signals, in accordance with a first embodiment. Although method 102 is described in the context of certain circuit and system implementations described in FIGS. 2, 3, and 4A, the method 102 may also be performed by a processing unit configured to execute programming instructions, other custom circuitry, or any combination thereof. Furthermore, persons of ordinary skill in the art will understand that any system that performs method 102 is within the scope and spirit of embodiments of the present invention. In one embodiment, method 102 is performed by the circuit of FIGS. 2, 3, and 4A. In general, method 102 is performed by a rail merge circuit, such as switch mode current balancing rail merge circuit 220.

Method 102 begins in step 120, where the rail merge circuit generates a reference signal based on the two or more current measurement signals. In one embodiment, the reference signal implements an averaging function over the two or more current measurement signals. In certain embodiments, the averaging function is bandwidth-limited, with a cut-off frequency that is lower than a frequency corresponding to the switching cycle. For example, if the switching cycle corresponds to a frequency of 100 KHz, then the cut-off frequency may be 20 KHz. In such embodiments, high-frequency noise transients within the two or more current measurement signals are attenuated within the reference signal. In other embodiments, each of the two or more current measurement signals may be similarly bandwidth-limited.

In step 122, the rail merge circuit generates a difference signal corresponding to each current measurement signal. In one embodiment, each difference signal represents a difference between the reference signal and a corresponding current measurement signal. In step 124, the rail merge circuit generates a periodic error signal corresponding to each difference signal. In one embodiment, each periodic error signal represents a sum of a corresponding difference signal and a corresponding phase-shifted discriminator signal. A set of phase-shifted discriminator signals may be evenly distributed through a switching cycle. For example, in an implementation having three current measurement signals, three difference signals, three periodic error signals, and three phase-shifted discriminator signals, each of the three phase-shifted discriminator signals may be one-hundred twenty degrees apart. In one embodiment, each phase-shifted discriminator signal comprises a triangle wave. In step 126, the rail merge circuit selects a supply rail corresponding to one periodic error signal having a maximum value compared to other associated periodic error signals.

In one embodiment, each supply rail is configured to provide a substantially equal maximum average current. When each supply rail is providing a substantially equal average current, each supply rail is also selected for a substantially equal time during a switching cycle. That is, each supply rail provides current to the merged supply node at a substantially equal duty cycle. In other embodiments, one or more supply rails may be configured to provide a different maximum average current than one or more of the other supply rails. In such embodiments, each supply rail may be selected for a span of time that is relatively proportional to other supply rails during a switching cycle, based on relative current capacity of each supply rail.

Figure 1C:
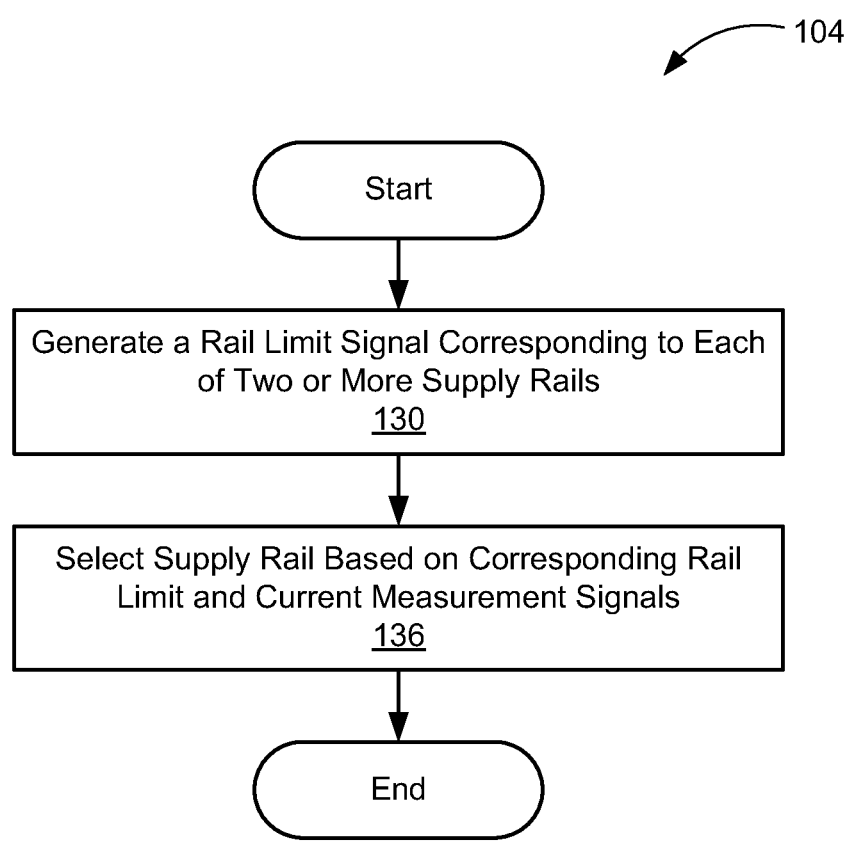
FIG. 1C illustrates a flow chart of another method for selecting one supply rail based on two or more current measurement signals, in accordance with a second embodiment.

FIG. 1C illustrates a flow chart of a method 104 for selecting one supply rail based on two or more current measurement signals, in accordance with a second embodiment. Although method 104 is described in the context of certain circuit and system implementations described in FIGS. 2, 3, 5A, 5B, and 5C, the method 104 may also be performed by a processing unit configured to execute programming instructions, other custom circuitry, or any combination thereof. Furthermore, persons of ordinary skill in the art will understand that any system that performs method 104 is within the scope and spirit of embodiments of the present invention. In one embodiment, method 104 is performed by the circuit of FIGS. 2, 3, 5A. 5B, and 5C. In general, method 104 is performed by a rail merge circuit, such as switch mode current balancing rail merge circuit 220.

Method 104 begins in step 130, where the rail merge circuit generates a rail limit signal corresponding to each of two or more supply rails. In one embodiment, the rail limit signal represents a unit of charge each supply rail may provide to the merged supply rail within one switching cycle. The unit of charge may correspond to a certain maximum peak current and duration for each supply rail, a peak load duty cycle for each supply rail at a given peak current, or any other technically feasible metric used to determine a unit of charge. Each current measurement signal may comprise an integrated representation of a current sense signal that indicates instantaneous current sourced from a corresponding supply rail. In step 136, the rail merge circuit selects a supply rail based on an associated rail limit signal and the current measurement signal. In one embodiment, a first supply rail is selected at the beginning of a switching cycle, and a second supply rail is selected after the first supply rail has provided a predetermined unit of charge indicated by a corresponding first rail limit signal, and so forth.

Figure 2:
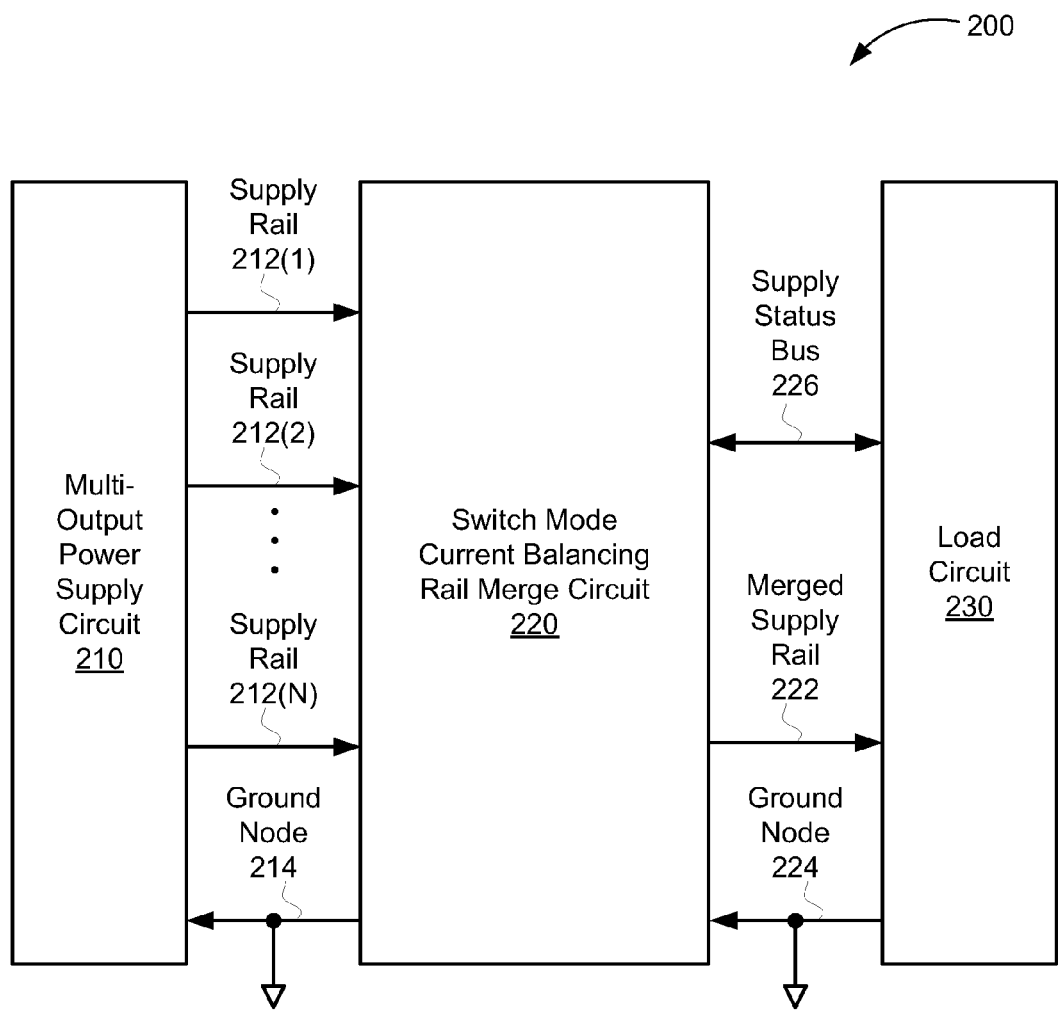
FIG. 2 illustrates a system comprising a switch mode current balancing rail merge circuit, according to one embodiment.

FIG. 2 illustrates a system 200 comprising a switch mode current balancing rail merge circuit 220, according to one embodiment. As shown, system 200 includes a multi-output power supply circuit 210, configured to supply power to the switch mode current balancing rail merge circuit 220 through two or more supply rails 212. Ground node 214 provides a current return path from current being received through the supply rails 212. In one embodiment, each supply rail 212 is regulated by the multi-output power supply circuit 210 to provide a substantially identical voltage with respect to the ground node 214. The switch mode current balancing rail merge circuit 220 merges current from the supply rails 212 into merged supply rail 222, with ground node 224 serving as a current return path. Load circuit 230 is coupled to the merged supply rail 222 and ground node 224. Load circuit 230 is configured to draw current from the merged supply rail 222 and operate using the current. Load circuit 230 may comprise any technically appropriate electrical load, configured to draw current and operate at a voltage potential associated with the merged supply rail 222 relative to the ground node 224. The load circuit 230 may draw highly variable current through merged supply rail 222. As average current supplied to load circuit 230 through merged supply rail 222 increases, average current provided by each supply rail 212 proportionately increases.

In certain scenarios, load circuit 230 may be capable of drawing current in excess of a maximum average current specified for a combined average current for the supply rails 212. In one embodiment, a supply status bus 226 coupled to the switch mode current balancing rail merge circuit 220 and to the load circuit 230 is configured to notify the load circuit 230 that a maximum average current specification is being exceeded. Upon such notification, the load circuit 230 may implement application-specific procedures to reduce power consumption.

In one embodiment, the load circuit comprises a processing subsystem that includes a graphics processing unit (GPU), one or more memory modules, and power conversion circuits configured to generate supply voltages for the GPU and memory modules using electrical current drawn from the merged supply rail 222. The GPU may throttle processing speed down when notified through supply status bus 226 that too much current is being drawn. While a GPU subsystem is discussed herein as one type of load circuit, any load circuit comprising an arbitrary collection of components may be implemented as load circuit 230 without departing the scope and spirit of embodiments of the present invention.

Figure 3:
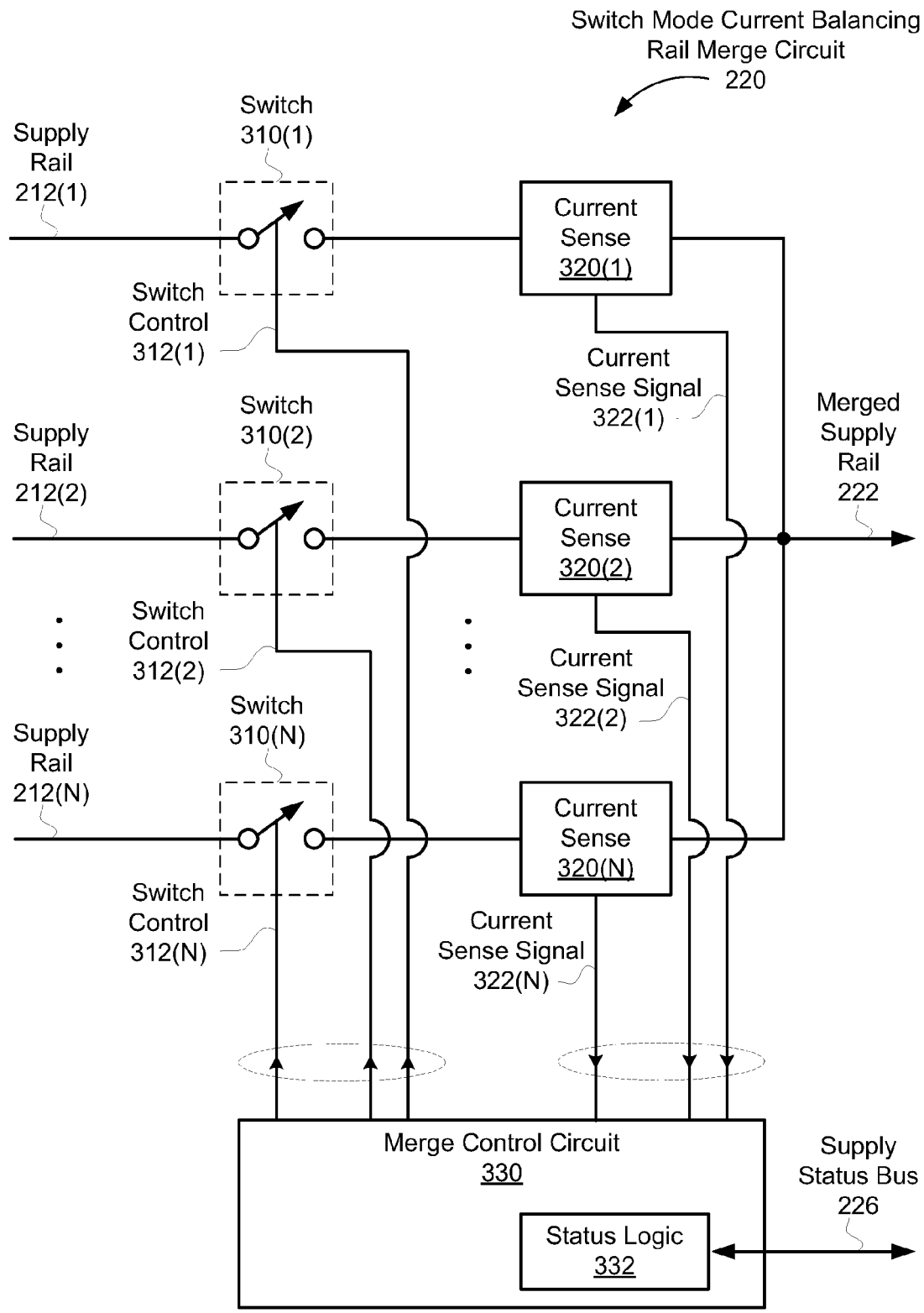
FIG. 3 illustrates a detailed view of the switch mode current balancing rail merge circuit shown in FIG. 2, according to one embodiment.

FIG. 3 illustrates a more detailed view of the switch mode current balancing rail merge circuit 220 comprising a merge control circuit 330, according to one embodiment. As shown, each supply rail 212 is coupled to a current sense circuit 320 through a switch 310. Current sense circuits 320 are further coupled to merged supply rail 222. Each switch 310 is controlled by a switch control signal 312, which is generated by the merge control circuit 330. Each current sense circuit 320 generates a corresponding current sense signal 322, which may be a single-ended analog signal, a differential analog signal, a digital signal or any other technically feasible signal that provides a specific current measurement. In one embodiment, each current sense circuit 320 comprises a resistor, and a corresponding current sense signal 322 may be represented as a differential analog signal comprising each of two electrical nodes associated with the resistor. The resistor may be specified to have a relatively low resistance, such as a tenth of an ohm or less resistance, to reduce inefficiencies associated with measurement loss.

The switch mode current balancing rail merge circuit 220 may be configured to merge current from two or more supply rails 212 into the merged supply rail 222. In certain embodiments, merge control circuit 330 is configured to adapt to operating with an arbitrary number of supply rails 212, which may be hot-plugged in or out of active operation. Merge control circuit 330 is configured to select one supply rail 212 for a brief span of time, and subsequently select another supply rail 212 for a brief span of time, and so forth until each active supply rail 212 has been selected. When a supply rail 212 is selected, the merge control circuit 330 transmits an enable value through a corresponding switch control signal 312 to turn on (i.e., close) an associated switch 310.

In one embodiment, each switch 310 comprises a power N-FET or a power P-FET, and each switch control signal 312 is coupled to a gate node for a given power FET. A switch 310 implemented as a P-FET may be turned on when a corresponding switch signal 312 is pulled to a voltage substantially representing a ground voltage (in general a threshold voltage lower than a supply rail voltage), whereas the P-FET may be turned off when the switch signal 312 is pulled to approximately the voltage of a corresponding supply rail 212. Each switch 310 may be implemented using other or additional circuit elements, including other transistors, buffer circuits, amplifier circuits, and the like.

A status logic circuit 332 is configured to generate notifications through supply status bus 226 related to certain power consumption metrics. One notification may indicate that average current consumption has exceeded a certain threshold related to a maximum specification for current consumption. The status logic circuit 332 may notify the load circuit 230 of FIG. 2 that too much current is being drawn, thereby initiating power-reduction procedures to execute within the load circuit 230. In one embodiment, supply status bus 226 comprises an industry standard I2C bus, a serial bus, or any other technically feasible bus configured to transmit data from a source device to a target device.

The merge control circuit 330 is configured to enable each switch 310 sequentially during a switching cycle to balance average current sourced from each supply rail 212 into the merged supply rail 222. A given supply rail 212 may provide an integral multiple of instantaneous current relative to average current for the supply rail 212, which is enabled according to a proportionally smaller duty cycle. A time duration associated with the switching cycle may be fixed for constant frequency operation or variable for constant charge transfer operation. A first embodiment of the merge control circuit 330 is illustrated in FIGS. 4A through 4D. A second embodiment of the merge control circuit 330 is illustrated in FIGS. 5A through 5F. These two embodiments provide exemplary implementations of current balancing techniques, however these techniques may be implemented in other circuits, including embedded processors configured to perform the techniques through execution of programming instructions.

Figure 4A:
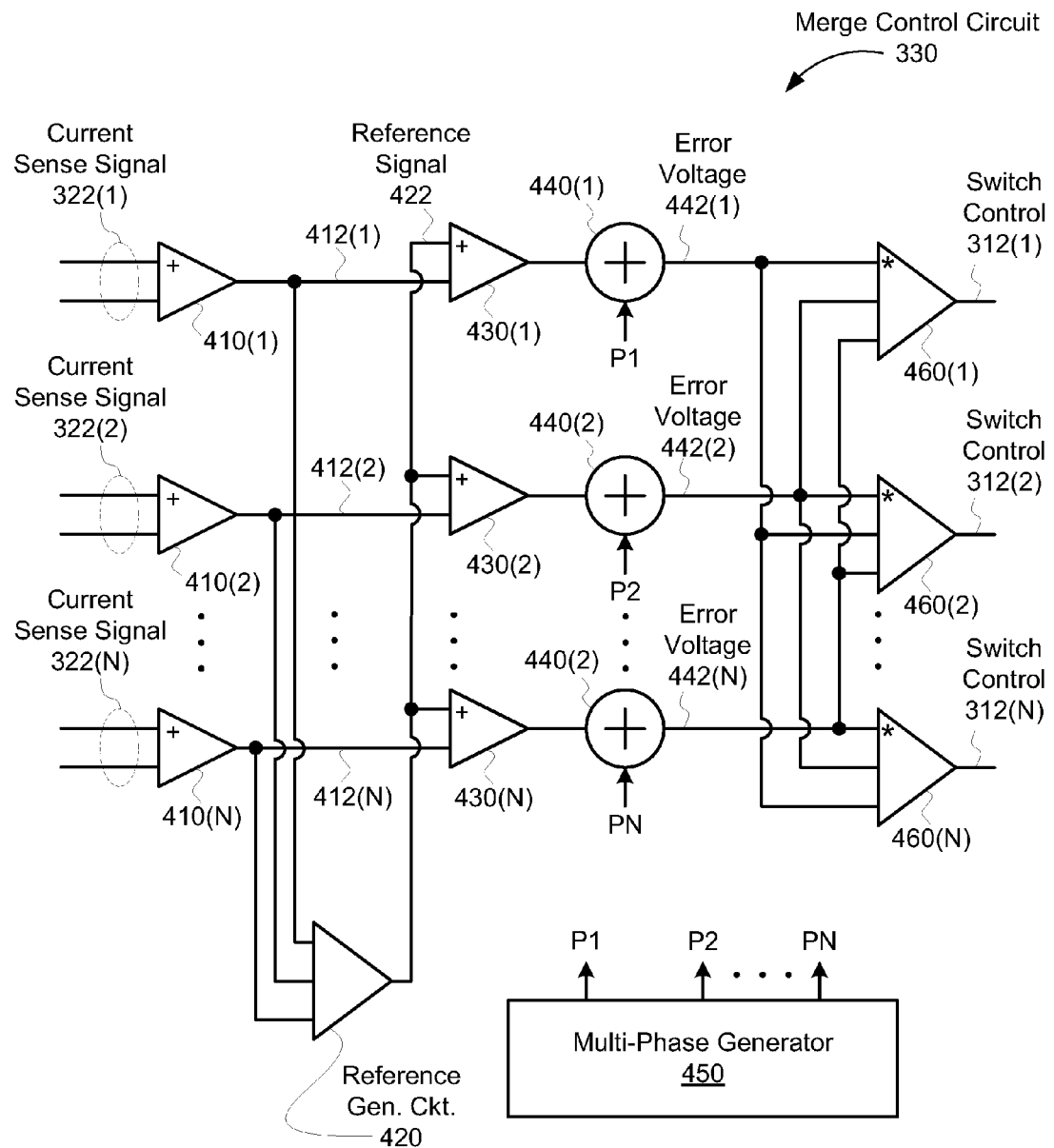
FIG. 4A illustrates a detailed view of the merge control circuit shown in FIG. 3, according to a first embodiment.

FIG. 4A illustrates a more detailed view of the merge control circuit 330 of FIG. 3, according to a first embodiment. As shown, each current sense signal 322 comprises a differential analog signal, which is amplified in a corresponding differential amplifier 410 to generate a current measurement signal 412. A reference generator circuit 420 receives each current measurement signal 412 and generates a reference signal 422. In one embodiment, the reference generator circuit 420 implements an averaging function, so that the reference signal 422 represents an average signal value of a collection of current measurement signals 412. Each current measurement signal 412 is then subtracted from the reference signal 422 by corresponding difference amplifiers 430 to generate a corresponding difference signal. An adder circuit 440, associated with a given difference signal, generates an error voltage 442 by adding the difference signal to a corresponding phase-shifted discriminator signal (P1, P2, PN). A maximum selector circuit 460 determines which error voltage 442 has the largest instantaneous value.

In one embodiment, a given maximum selector circuit 460 generates an enable output with a value of "true" to a corresponding switch control signal 312 when the maximum test input (marked as "*") has the highest voltage among all inputs to the maximum selector circuit 460. When a given switch control signal 312 is asserted true, a corresponding switch 310 of FIG. 3, is turned on, thereby allowing current to be sourced from an associated supply rail 212 to the merged supply rail 222. A multi-phase generator 450 is configured to generate each phase-shifted discriminator signal (P1, P2, PN). In one embodiment, each phase-shifted discriminator signal comprises a triangle wave. Other wave shapes may also be implemented without departing the scope and spirit of embodiments of the present invention.

Figure 4B:
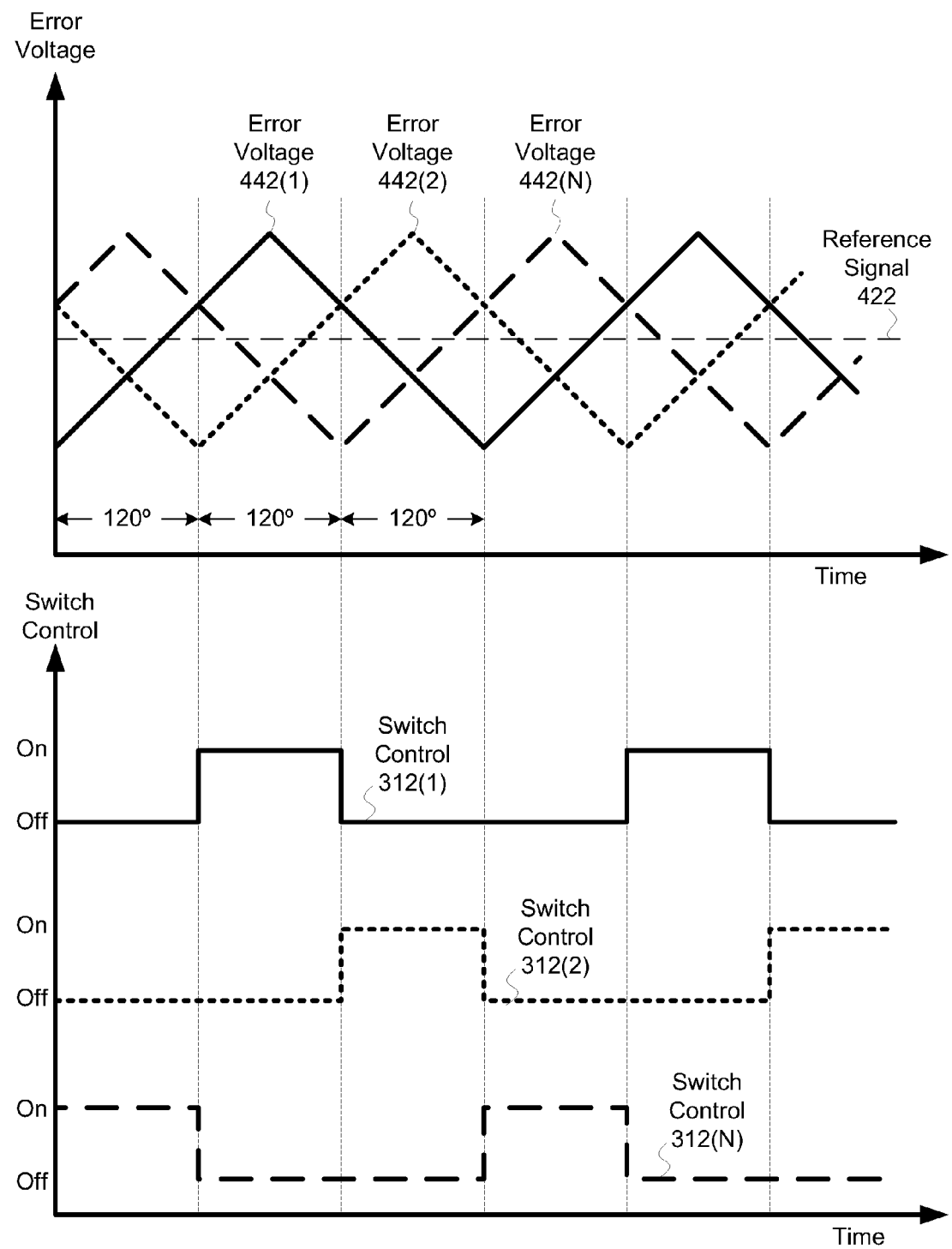
FIG. 4B illustrates operation of the switch mode current balancing rail merge circuit of FIG. 2 under steady-state balanced loading conditions, according to one embodiment.

FIG. 4B illustrates operation of the switch mode current balancing rail merge circuit 220 of FIG. 2 under steady-state balanced loading conditions, according to one embodiment. Each error voltage 442 is associated with one supply rail 212. Each error voltage 442 is generated as described previously in FIG. 4A, whereby each phase-shifted discriminator signal is generated to be a triangle wave with a relative one-hundred twenty degree offset from each other phase-shifted discriminator signal. As shown, each of the three error voltages 442 spends a substantially identical length of time having the maximum instantaneous value among the three error voltages 442. While a given error voltage 442 has the maximum instantaneous value, a corresponding switch control signal 312 is set true, which turns "on" an associated switch 310. When a given error voltage 442 does not have the maximum instantaneous value, the corresponding switch control signal 312 is set false, which turns "off" the associated switch 310. In the steady state operation shown, each switch is turned "on" for a substantially equal length of time, thereby causing each corresponding supply rail 212 to source a substantially equal average current.

In certain embodiments, each supply rail 212 is configured to supply a different maximum average current. In such embodiments, each switch control signal 312 is configured to remain "on" for a relative length of time that is proportional to an associated supply rail current capacity. In an exemplary system with three supply rails, where a first supply rail is able to source twice as much average current as a second or third supply rail, a control switch signal for the first supply rail is configured to be "on" twice as long as each of the second and third control switch signals during steady state operation. Persons skilled in the art will understand that a switch mode current balancing rail merge circuit 220 may be configured to adapt to different supply rail conditions and capabilities without departing the scope and spirit of the present invention.

Figure 4C:
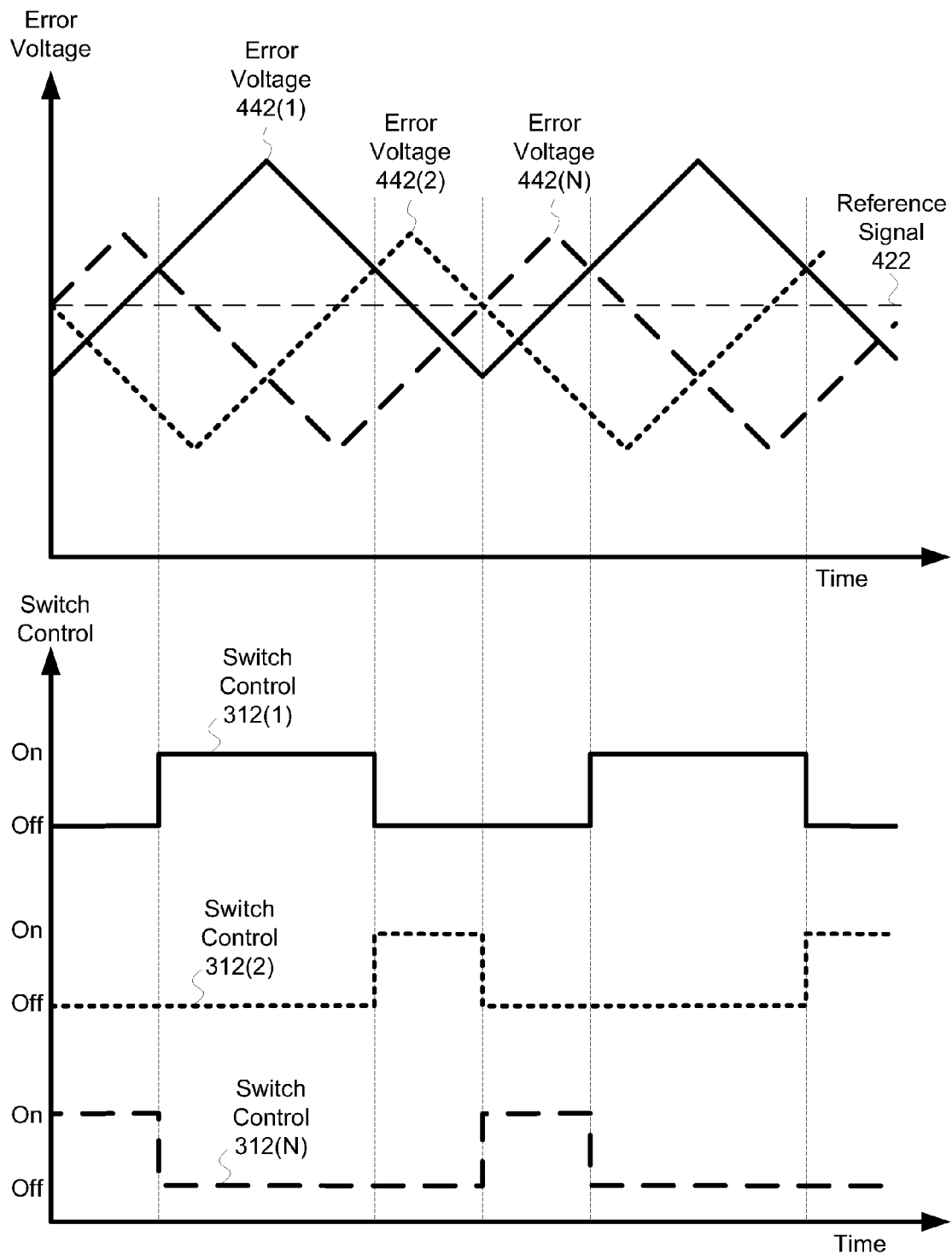
FIG. 4C illustrates operation of the switch mode current balancing rail merge circuit of FIG. 2 under imbalanced loading conditions with one supply rail supplying less current than other supply rails, according to one embodiment.

FIG. 4C illustrates operation of the switch mode current balancing rail merge circuit under imbalanced loading conditions with one supply rail supplying less current than other supply rails, according to one embodiment. As shown, error voltage 442(1) is asymmetrically offset above the reference signal 442. This condition may occur when supply rail 212(1) is temporarily providing less current than the average current provided by supply rails 212(1) through 212(N). With error voltage 442(1) offset higher, switch control signal 312(1) is asserted "on" for a longer duration than switch control signals 312(2) and 312(N).

Figure 4D:
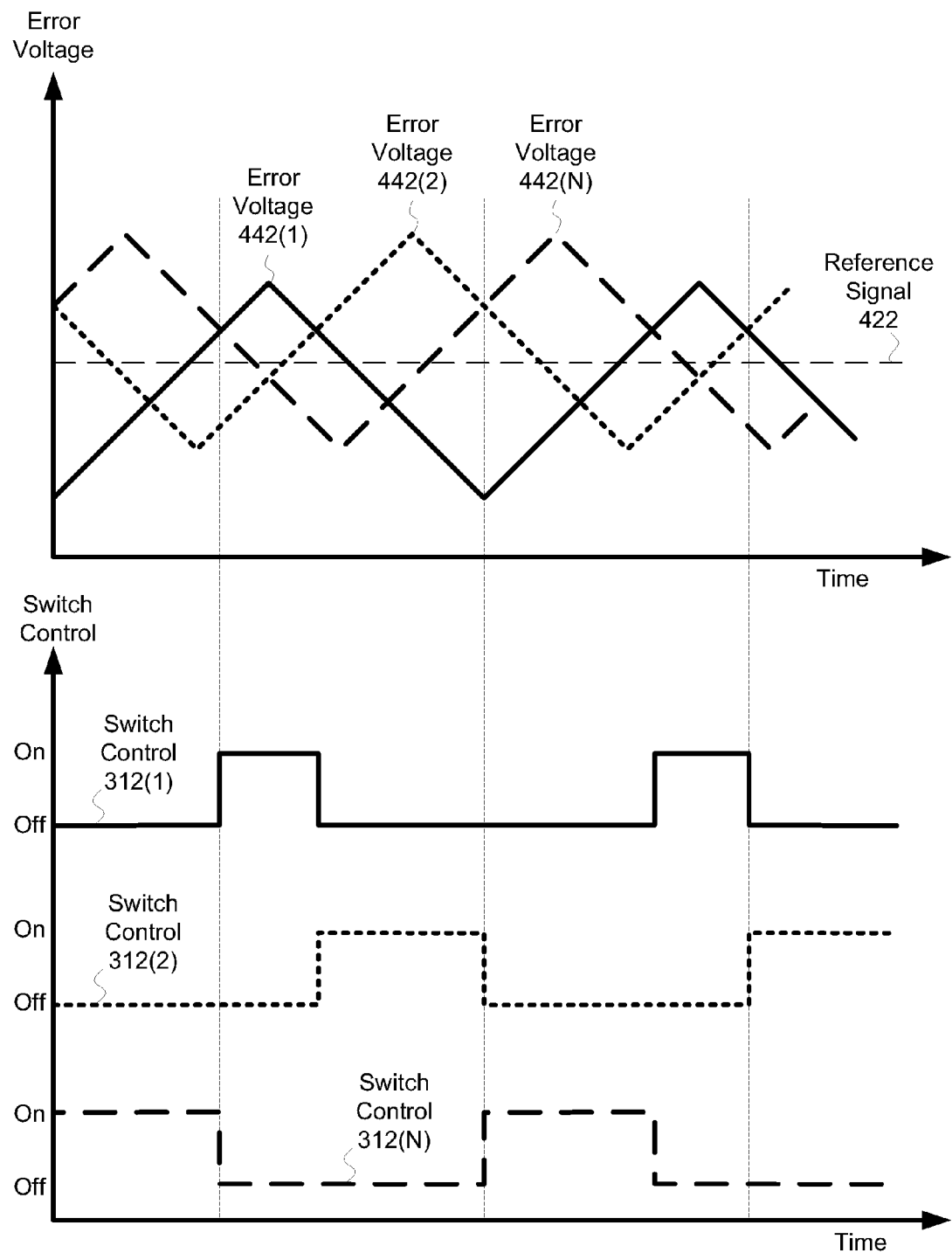
FIG. 4D illustrates operation of the switch mode current balancing rail merge circuit of FIG. 2 under imbalanced loading conditions with one supply rail supplying more current than other supply rails, according to one embodiment.

FIG. 4D illustrates operation of the switch mode current balancing rail merge circuit under imbalanced loading conditions with one supply rail supplying more current than other supply rails, according to one embodiment. As shown, error voltage 442(1) is asymmetrically offset below the reference signal 442. This condition may occur when supply rail 212(1) is temporarily providing more current than the average current provided by supply rails 212(1) through 212(N). With error voltage 442(1) offset lower, switch control signal 312(1) is asserted "on" for a shorter duration than switch control signals 312(2) and 312(N).

Over the course of one or more switching cycles, this mechanism of selecting a maximum error voltage described above in FIGS. 4B through 4D causes average current from each supply rail 212 to become balanced with respect to other supply rails.

Figure 5A:
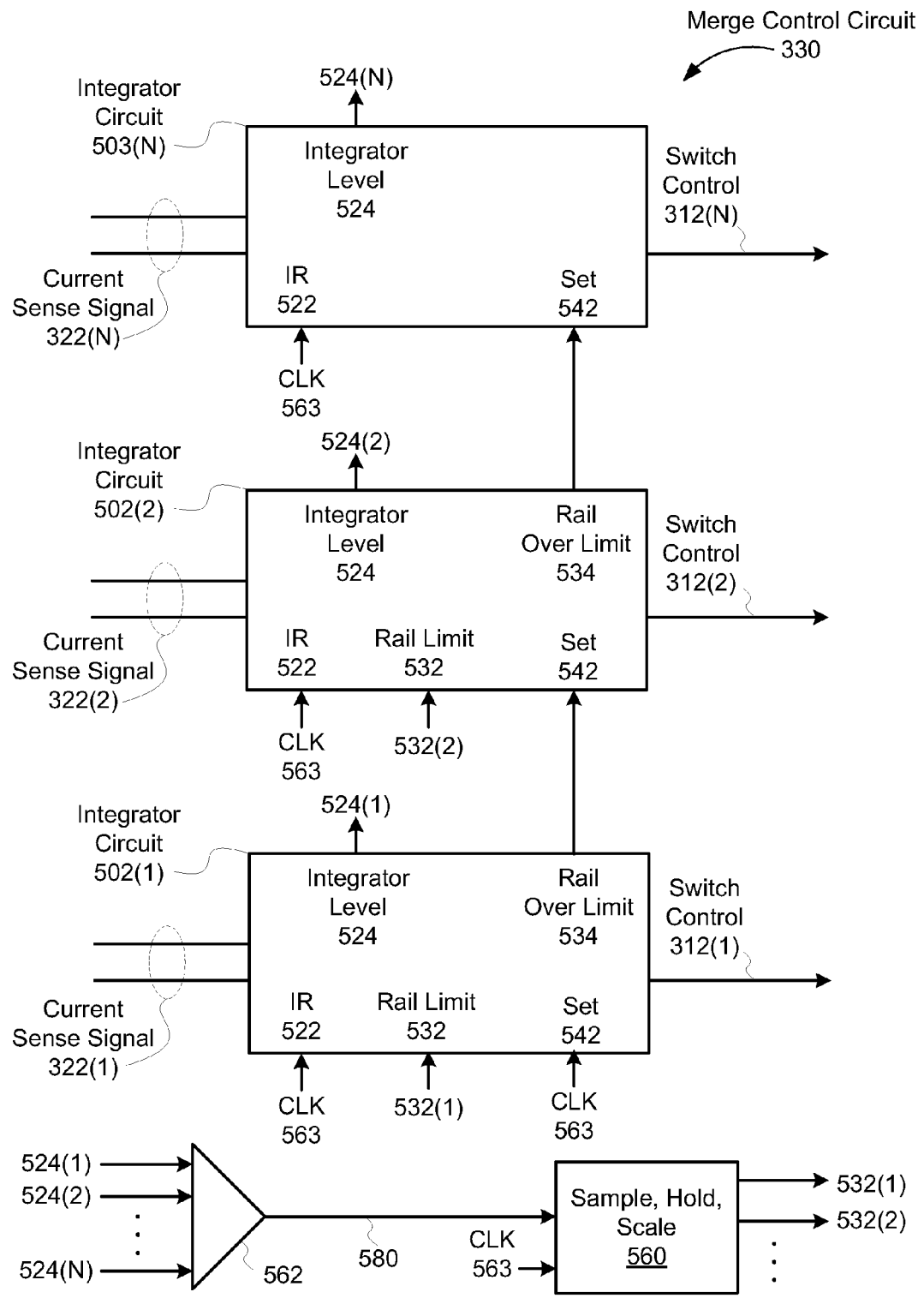
FIG. 5A illustrates a detailed view of the merge control circuit shown in FIG. 3, according to a second embodiment.

FIG. 5A illustrates a more detailed view of the merge control circuit 330 of FIG. 3, according to a second embodiment. As shown, the merge control circuit 330 comprises an instance of an integrator circuit 502 associated with each supply rail 212, a summation circuit 562, and a sample, hold, and scale circuit 560. Each integrator circuit 502 is configured to select a corresponding switch 310 by asserting an associated switch control signal 312 to "on" once per switching cycle, with a goal of sourcing a fixed unit of charge from a corresponding supply rail 212 into the merged supply rail 222. An instantaneous measure of charge delivered from a supply rail 212 to the merged supply rail 222 is provided through integration of current sourced from the supply rail 212. A switching cycle may conclude once each supply rail 212 has delivered the fixed unit of charge to the merged supply rail 222.

In one embodiment, integrator circuit 502 is configured to integrate an associated current sense signal 322 to generate a corresponding integrator level signal 524, which may be reset when an integrator reset (IR) signal 522 is asserted true. When the integrator level signal 524 reaches an amplitude that is established by a rail limit signal 532, the integrator circuit 502 generates a pulse on an associated rail over limit signal 534. When the integrator circuit 502 receives a pulse on an associated set signal 542, the integrator circuit 502 sets an associated switch control signal 312 true ("on"). When the rail over limit signal 534 is pulsed, the integrator circuit 502 asserts the switch control signal 312 false ("off"). Operation of one implementation of the integrator circuit 502 is discussed in greater detail below in FIG. 5B. Summation circuit 562 generates an integrator sum signal 580 representing a sum of each integrator level signal 524 within the merge control circuit 330. The sample, hold, and scale circuit 560 uses the integrator sum signal 580 in conjunction with each integrator level signal 524 at the end of a given switching cycle to generate rail limit signals 532 for a subsequent switching cycle. Each rail limit signal 532 reflects a corresponding supply rail current capacity. A clock (CLK) signal 563 may initiate a switching cycle and may cause the sample, hold, and scale circuit 560 to re-sample and hold the rail limit signals 532. In one embodiment, the clock signal is generated in conjunction with at least one integrator level signal 524. The integrator sum signal 580 may be used to generate an over-current notification to the load circuit.

Figure 5B:
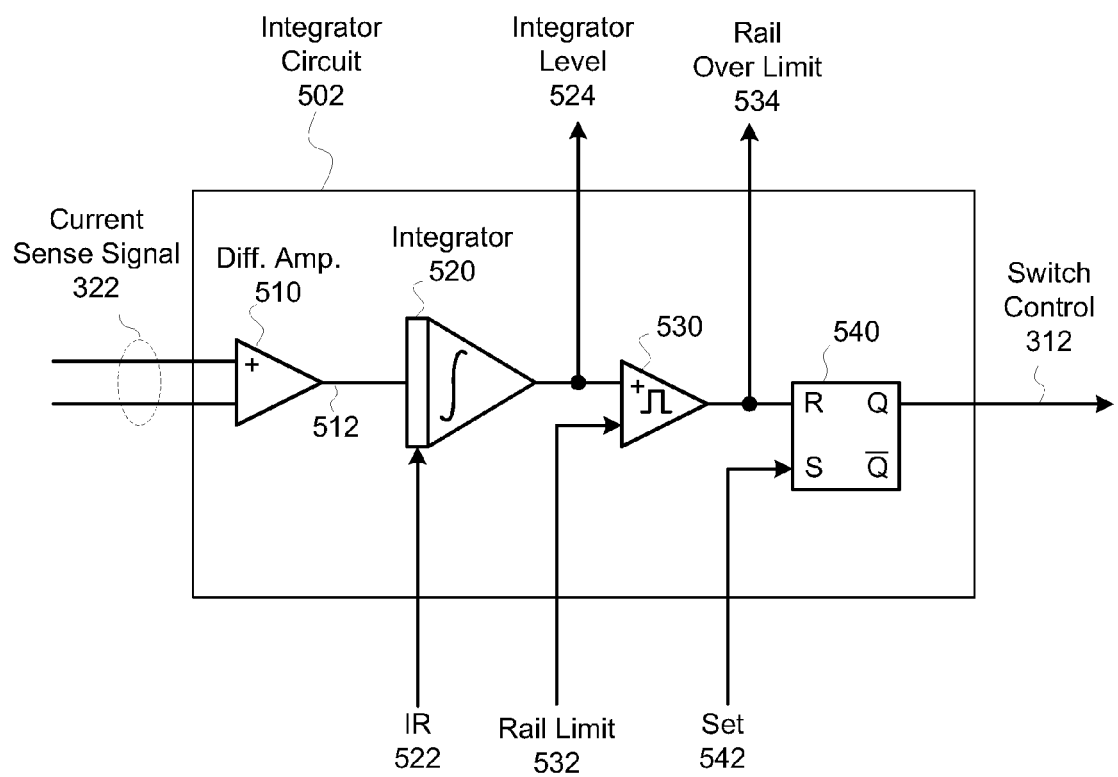
FIG. 5B illustrates an integrator circuit, according to the second embodiment.

FIG. 5B illustrates the integrator circuit 502, according to the second embodiment. As shown, the integrator circuit 502 comprises a differential amplifier 510, an integrator 520, a comparator pulse circuit 530, and a set-reset flip-flop 540. The differential amplifier receives current sense signal 322 to generate current measurement signal 512, which is then integrated by integrator 520 to generate the integrator level signal 524. Integrator 520 is reset when IR signal 522 is asserted true. Comparator pulse circuit 530 generates a pulse on the rail over limit signal 534 when the integrator level signal 524 exceeds the rail limit signal 532 in amplitude. The pulse should have a duration comprising a small fraction of a likely switching cycle duration, such as less than five percent of a switching cycle duration. The rail over limit signal 534 resets (Q=false) the set-reset flip-flop 540, which may have been previously set (Q=true) by the set signal 542 being asserted true. Operation of the integrator circuit 502 is illustrated below in FIG. 5D.

Figure 5C:
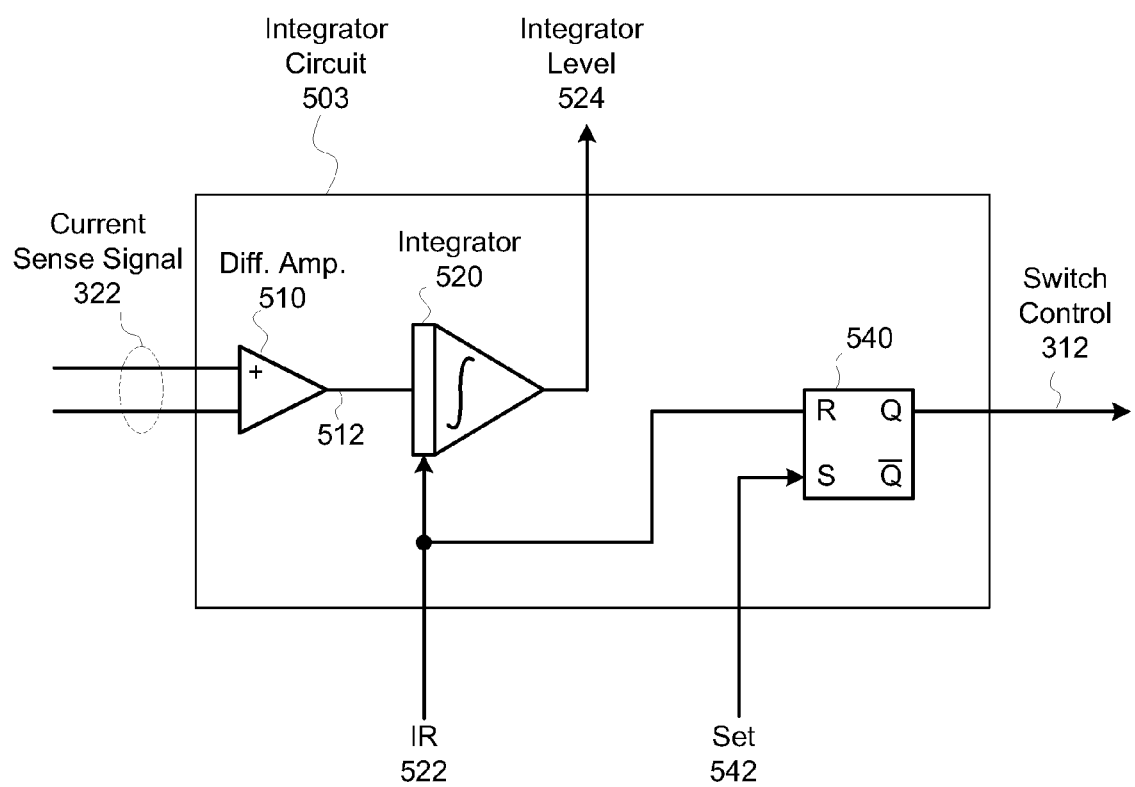
FIG. 5C illustrates a second integrator circuit, according to the second embodiment.

FIG. 5C illustrates a second integrator circuit 503, according to the second embodiment. As shown, the integrator circuit 503 comprises a subset of elements associated with integrator circuit 502 of FIG. 5B. As shown, the set-reset flip-flop 540 is reset through the IR signal 522 rather than by a comparator pulse circuit, which is omitted in integrator circuit 503.

Figure 5D:
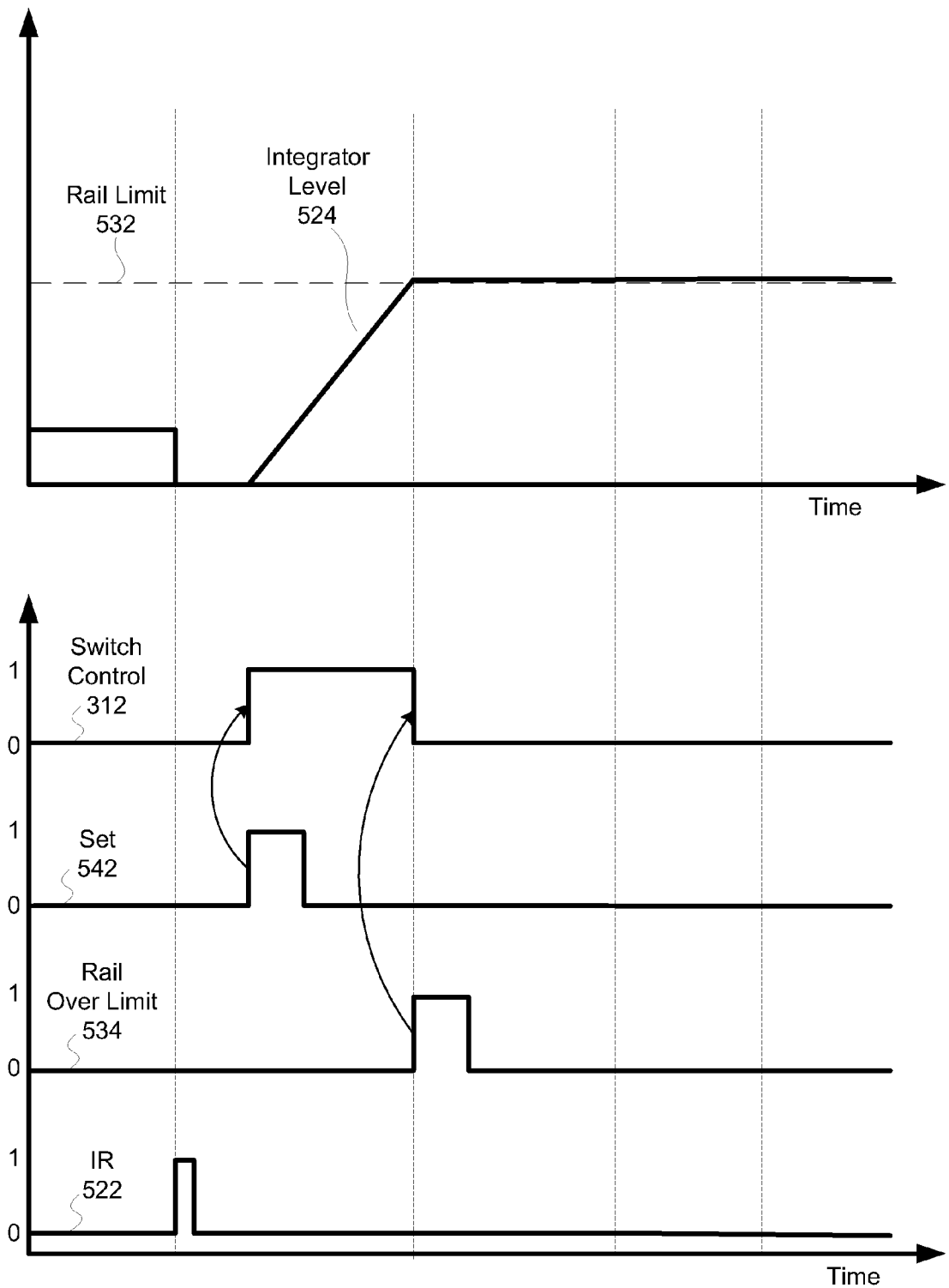
FIG. 5D illustrates operation of the integrator circuit shown in FIG. 5B, according to the second embodiment.

FIG. 5D illustrates operation of the integrator circuit 502, according to the second embodiment. As shown, IR signal 522 resets the integrator level signal 524 to a predetermined value, such as zero. A rising edge of the set signal 542 causes the set-reset flip-flop 540 of FIG. 5B to drive the switch control signal 312 to a value of "1" (switch "on"). With switch control signal 312 set to "on" a corresponding switch 310 is switched on, allowing current to flow from an associated supply rail 212 to the merged supply rail 222. A measure of accumulated charge transfer as a result of the flow of current is reflected in integrator level signal 524. As shown, integrator level signal 524 increases until reaching rail limit 532, at which point the comparator pulse circuit 530 generates a pulse on the rail over limit signal 534. A rising edge on the rail over limit signal 534 signal resets the set-reset flip-flop 540, causing the switch control signal 312 to return to "0" (switch "off").

Figure 5E:
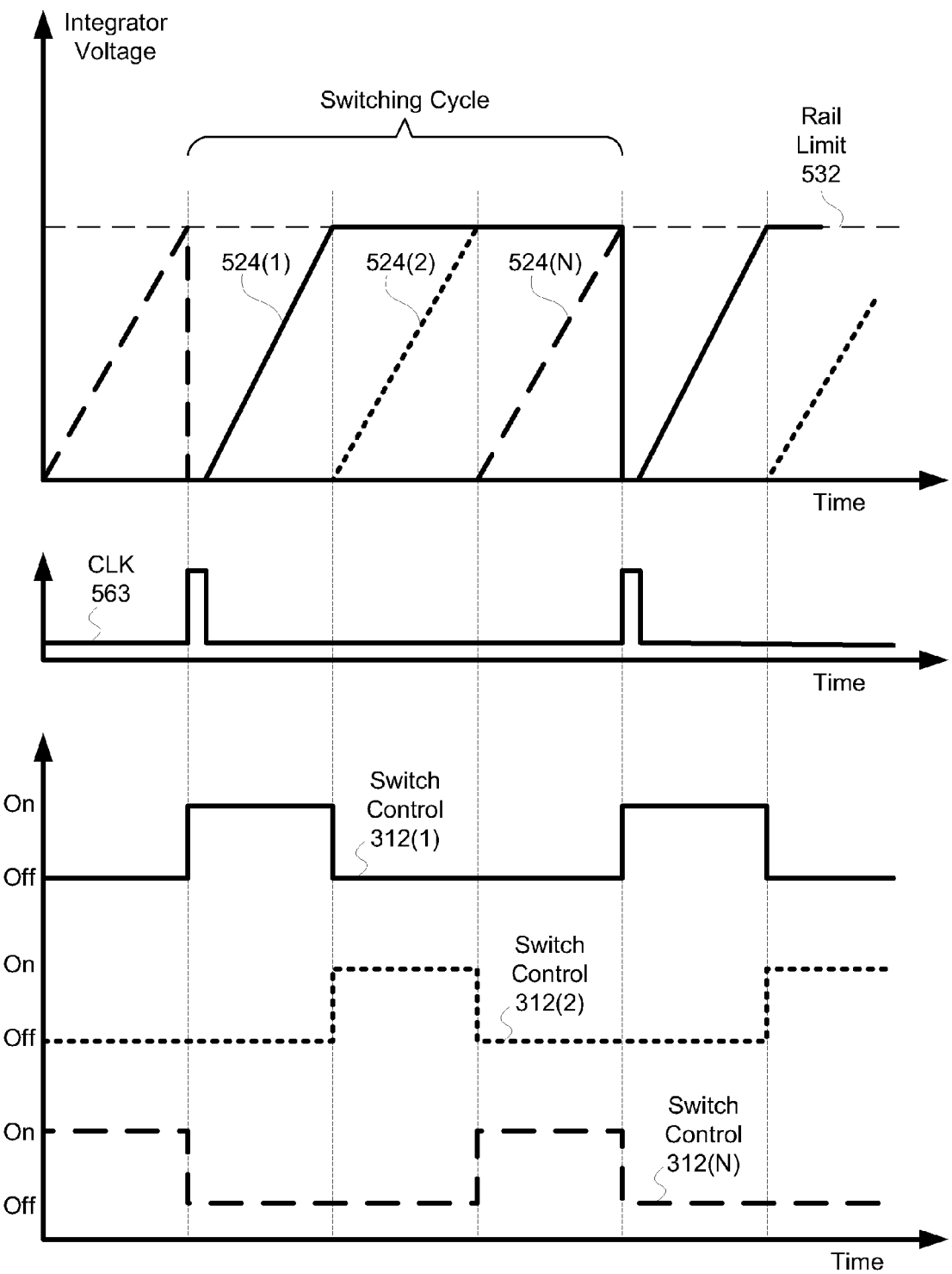
FIG. 5E illustrates operation of the switch mode current balancing rail merge circuit shown in FIG. 2 under balanced loading conditions, according to the second embodiment.

FIG. 5E illustrates operation of the switch mode current balancing rail merge circuit 220 of FIG. 2 under balanced loading conditions, according to the second embodiment. As shown, a switching cycle begins with the rising edge of CLK 563. Switch control signal 312(1) is asserted on, and current flows from supply rail 212(1) to the merged supply rail 222. When integrator level signal 524(1) reaches rail limit 532, switch control 312(1) is asserted off, while switch control 312(2) is asserted on. At this point, integrator level signal 524(2) begins to increase until reaching rail limit 532, causing switch control 312(2) to be asserted off, while switch control 312(N) is asserted on. Once integrator level signal 524(N) reaches rail limit 532, switch control 312(N) is asserted off, completing a switching cycle. With each supply rail providing substantially equal current, each switch control signal 312 is asserted on for a substantially equal length of time.

Figure 5F:
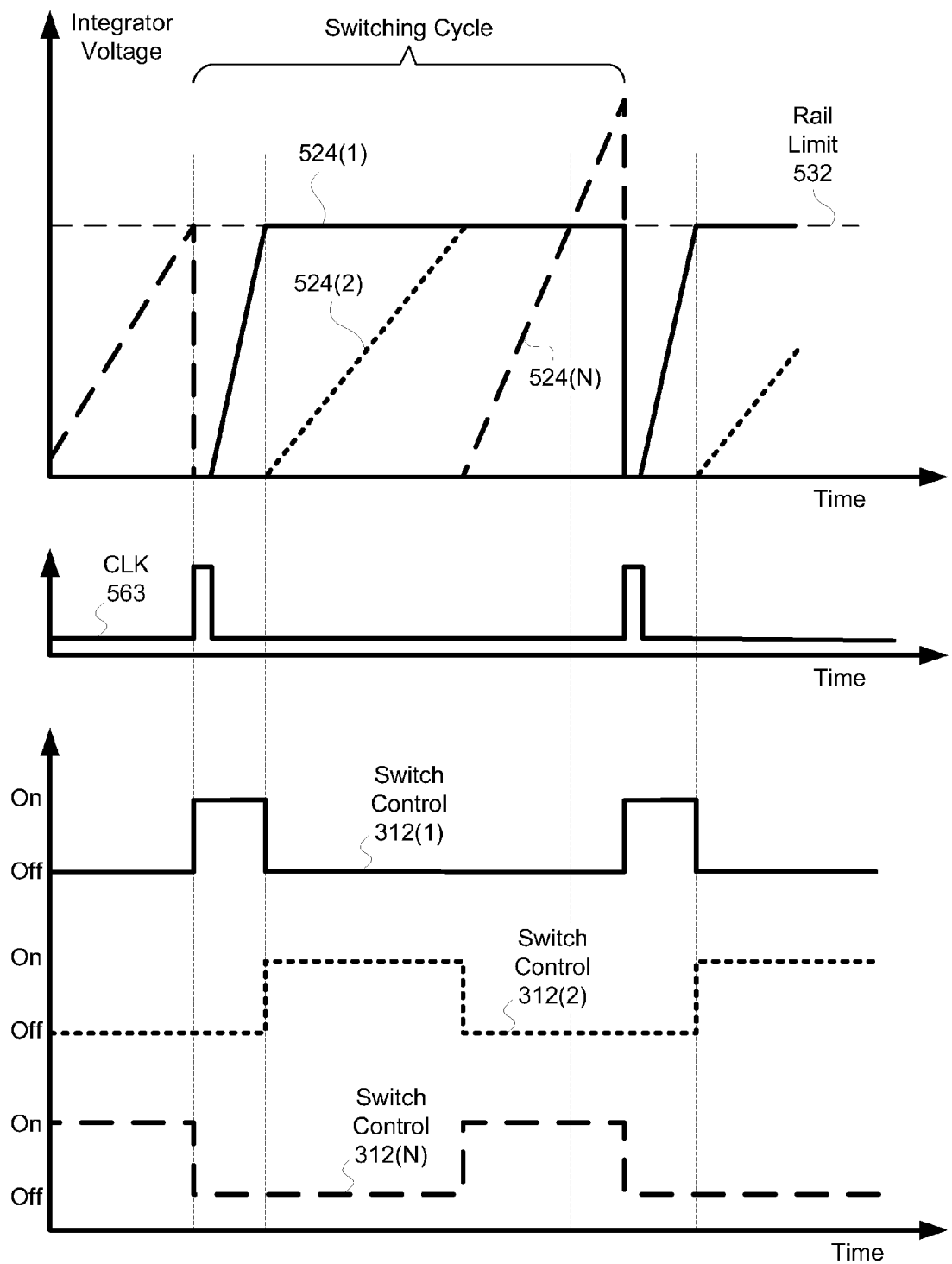
FIG. 5F illustrates operation of the switch mode current balancing rail merge circuit shown in FIG. 2 under imbalanced loading conditions with one supply rail supplying more current than other supply rails, according to one embodiment.

FIG. 5F illustrates operation of the switch mode current balancing rail merge circuit 220 of FIG. 2 under imbalanced loading conditions with one supply rail supplying more current than other supply rails, according to one embodiment. When operating under imbalanced loading conditions, each integrator level signal 524 may rise at a different rate from other integrator level signals 524. As shown, integrator level signal 524(1) rises much more sharply than integrator level signal 524(2), indicating supply rail 212(1) is sourcing more current than supply rail 212(2). As a consequence, integrator level signal 524(1) reaches rail limit 532 in a shorter length of time than integrator level signal 524(2) reaches rail limit 532. This leads to a shorter duration of switch control signal 312(1) being asserted on, relative to switch control signal 312(2). The shorter duration of switch control signal 312(1) being asserted on reduces average current sourced by supply rail 212(1), leading to a more balanced current contribution of each supply rail 212. This mechanism of modulating on time for each switch control signal 312 may also increase average current provided by a supply rail 212 that is providing less current than other supply rails 212. As shown, integrator level signal 524(N) continues to rise until a new clock pulse on clock signal 563 independently of a rail limit 532. Switch control 312(N) remains asserted in an on state until the new clock pulse arrives. As average power delivered to the merged supply rail 222 generally increases, each supply rail 212 generally sources more current, generally maintaining a specified proportional balance of average current among the supply rails 212. A system limit may be reached, whereby supply rail 212(N) is drawing excessive current. At this point, the load circuit 230 is notified, such as through supply status bus 226, that it must reduce power consumption.

Figure 5G:
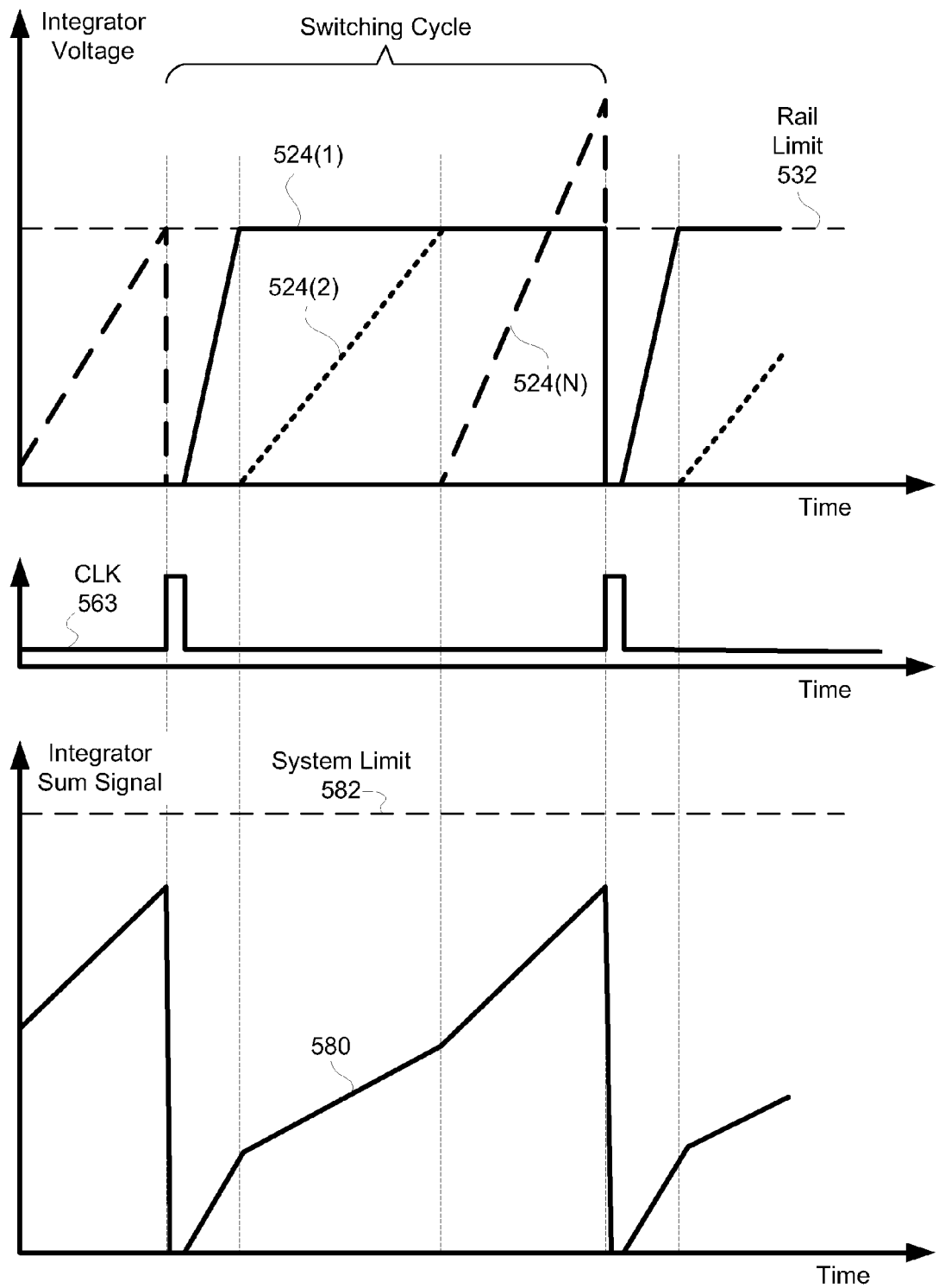
FIG. 5G illustrates an integrator sum signal generated from individual integrator level signals, according to one embodiment.

FIG. 5G illustrates an integrator sum signal 580 generated from individual integrator level signals 524, according to one embodiment. As shown, integrator sum signal 580 reflects a sum of integrator level signals 524(1), 524(2), and 524(N). In a scenario where the integrator sum signal 580 exceeds a system limit 582, load circuit 230 is notified that it needs to reduce power consumption. The system limit 582 may be defined as a maximum current or a maximum average current over a specified time duration that the load circuit 230 may draw through merged supply rail 222.

Figure 6:
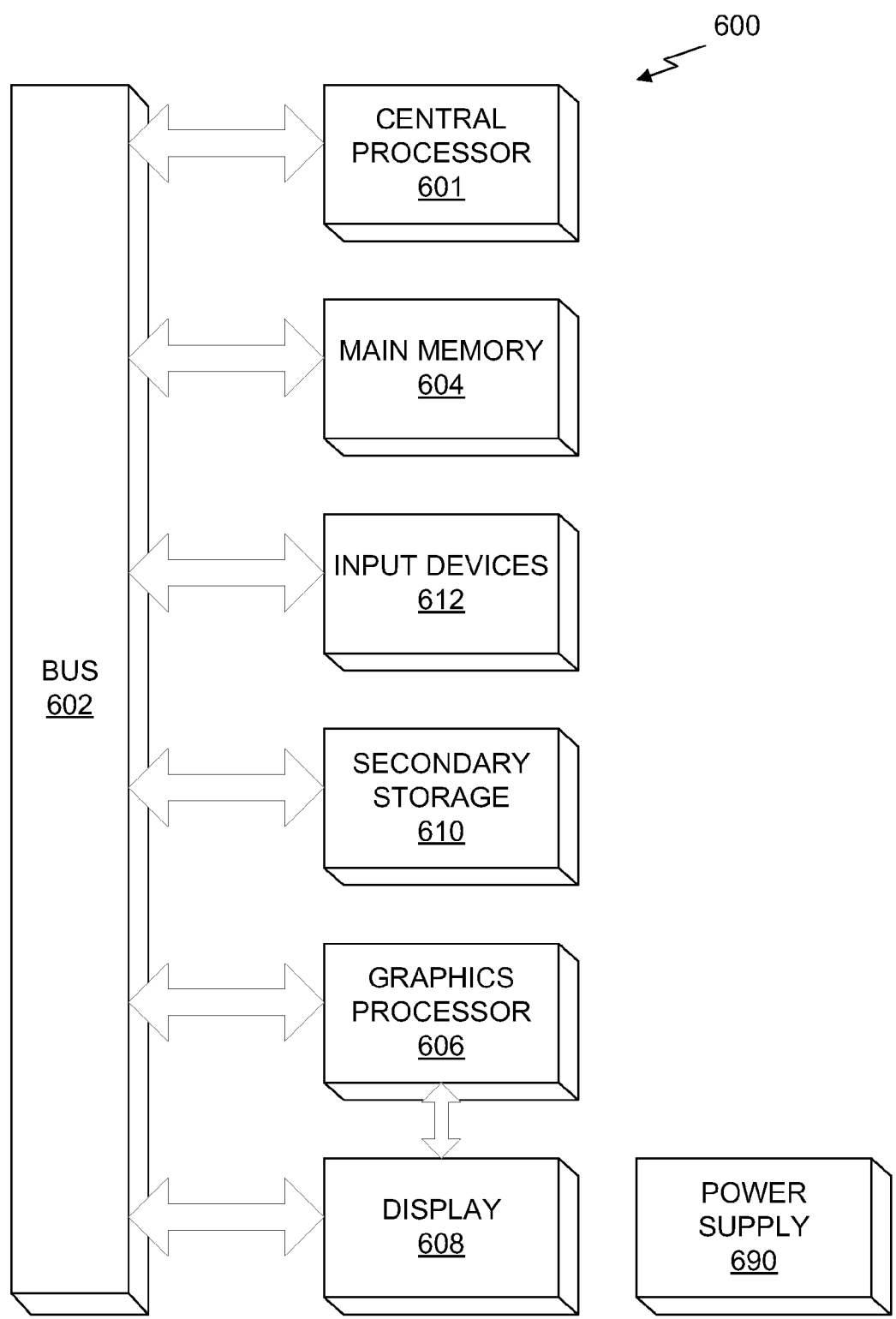
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604, which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In one embodiment, the system 600 includes a power supply 690, configured to implement the switch mode current balancing rail merge circuit 220 of FIG. 2. In such an embodiment, the graphics processor 606, central processor 601, main memory 604, or any combination thereof may comprise load circuit 230.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 604 and/or the secondary storage 610. Such computer programs, when executed, enable the system 600 to perform various functions. The main memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving two or more current measurement signals associated with two or more supply rails, wherein each current measurement signal is associated with one supply rail from the two or more supply rails;
   computing a difference signal for each supply rail as a difference between the current measurement signal and an average signal value of the two or more current measurement signals;
   selecting a first supply rail of the two or more supply rails, the first supply rail having a maximum value of the difference signals;
   enabling the first supply rail to source current into a merged supply rail;
   after enabling the first supply rail, determining a second supply rail of the two or more supply rails has the maximum value of the difference signals;
   disabling the first supply rail to source current into the merged supply rail; and
   enabling the second supply rail to source current into the merged supply rail.

2. The method of claim 1, further comprising updating an operating status based on the current measurement signals and a threshold value.

3. A method, comprising:
   receiving two or more current measurement signals associated with two or more supply rails, wherein each current measurement signal is associated with one supply rail from the two or more supply rails;
   computing a difference signal for each supply rail as a difference between the current measurement signal and an average signal value of the two or more current measurement signals;
   generating periodic error signals corresponding to the difference signals, wherein each periodic error signal is a sum of a corresponding one of the difference signals and a corresponding periodic phase-shifted discriminator signal;
   selecting a first supply rail of the two or more supply rails, the first supply rail having a maximum value of the periodic error signals; and
   enabling the first supply rail to source current into a merged supply rail.

4. The method of claim 1, wherein the average signal value comprises a bandwidth-limited signal.

5. The method of claim 1, wherein each of the two or more current measurement signals comprises a bandwidth-limited signal.

6. The method of claim 1, wherein each current sensing signal comprises a differential signal that represents current flowing through a current sensing element.

7. The method of claim 6, wherein the current sensing element comprises a resistor and the differential signal comprises voltage samples taken at each of two electrical nodes associated with the resistor.

8. A computer-readable storage medium storing instructions that, when executed by a processor, cause the processor to perform steps comprising:
   receiving two or more current measurement signals that are associated with two or more supply rails;
   computing a difference signal for each supply rail as a difference between the current measurement signal and an average signal value of the two or more current measurement signals;
   selecting a first supply rail of the two or more supply rails, the first supply rail having a maximum value of the difference signals;
   enabling the first supply rail to source current into a merged supply rail;
   after enabling the first supply rail, determining a second supply rail of the two or more supply rails has the maximum value of the difference signals;
   disabling the first supply rail to source current into the merged supply rail; and
   enabling the second supply rail to source current into the merged supply rail.

9. A computer-readable storage medium storing instructions that, when executed by a processor, cause the processor to perform steps comprising:
   receiving two or more current measurement signals associated with two or more supply rails, wherein each current measurement signal is associated with one supply rail from the two or more supply rails;
   computing a difference signal for each supply rail as a difference between the current measurement signal and an average signal value of the two or more current measurement signals;
   generating periodic error signals corresponding to the difference signals, wherein each periodic error signal is a sum of a corresponding one of the difference signals and a corresponding periodic phase-shifted discriminator signal;
   selecting a first supply rail of the two or more supply rails, the first supply rail having a maximum value of the periodic error signals; and
   enabling the first supply rail to source current into a merged supply rail.

10. A system, comprising:
    a multi-output power supply circuit configured to provide two or more supply rails;

a load circuit configured to receive electrical energy through a merged supply rail; and
a rail merge circuit, configured to:
receive two or more current measurement signals that are associated with the two or more supply rails;
compute a difference signal for each supply rail as a difference between the current measurement signal and an average signal value of the two or more current measurement signals;
select a first supply rail of the two or more supply rails, the first supply rail having a maximum value of the difference signals;
enable the first supply rail to source current into a merged supply rail;
after enabling the first supply rail, determine a second supply rail of the two or more supply rails has the maximum value of the difference signals;
disable the first supply rail to source current into the merged supply rail; and
enable the second supply rail to source current into the merged supply rail.

11. A system comprising:
a multi-output power supply circuit configured to provide two or more supply rails;
a load circuit configured to receive electrical energy through a merged supply rail; and
a rail merge circuit, configured to:
receive two or more current measurement signals that are associated with the two or more supply rails;
compute a difference signal for each supply rail as a difference between the current measurement signal and an average signal value of the two or more current measurement signals;
generate periodic error signals corresponding to the difference signals, wherein each periodic error signal is a sum of a corresponding one of the difference signals and a corresponding periodic phase-shifted discriminator signal;
select a first supply rail of the two or more supply rails, the first supply rail having a maximum value of the periodic error signals; and
enable the first supply rail to source current into a merged supply rail.

12. The method of claim 3, wherein the periodic phase-shifted discriminator signals are evenly distributed through a switching cycle.

13. The method of claim 1, further comprising:
generating a notification indicating an average current provided by the merged supply rail to a load circuit exceeds a predefined maximum value; and
outputting the notification to the load circuit that is coupled to the merged supply rail.

14. The method of claim 1, further comprising:
generating a notification indicating an instantaneous current provided by at least one of the two or more supply rails exceeds a predefined maximum value; and
outputting the notification to a load circuit that is coupled to the merged supply rail.

15. The computer-readable storage medium of claim 8, further comprising:
generating a notification indicating an average current provided by the merged supply rail to a load circuit exceeds a predefined maximum value; and
outputting the notification to the load circuit that is coupled to the merged supply rail.

16. The system of claim 10, wherein the rail merge circuit is further configured to:
generate a notification indicating an average current provided by the merged supply rail to a load circuit exceeds a predefined maximum value; and
output the notification to the load circuit that is coupled to the merged supply rail.

17. A method, comprising:
receiving two or more current measurement signals associated with two or more supply rails,
wherein each current measurement signal is associated with one supply rail from the two or more supply rails;
computing a difference signal for each supply rail as a difference between the current measurement signal and an average signal value of the two or more current measurement signals;
selecting a first supply rail of the two or more supply rails, the first supply rail having a maximum value of the difference signals;
enabling the first supply rail to source current into a merged supply rail;
generating a notification indicating a current provided by the at least one of the merged supply rail, the first supply rail, and the second supply rail exceeds a predefined maximum value; and
outputting the notification to a load circuit that is coupled to the merged supply rail.

18. The method of claim 17, wherein the current is an average current and the notification indicates that the average current provided by the merged supply rail to the load circuit exceeds the predefined maximum value.

19. The method of claim 17, wherein the current is an instantaneous current and the notification indicates that the instantaneous current provided by at least one of the first supply rail and the second supply rail exceeds the predefined maximum value.

20. A computer-readable storage medium storing instructions that, when executed by a processor, cause the processor to perform steps comprising:
receiving two or more current measurement signals that are associated with two or more supply rails;
computing a difference signal for each supply rail as a difference between the current measurement signal and an average signal value of the two or more current measurement signals;
selecting a first supply rail of the two or more supply rails, the first supply rail having a maximum value of the difference signals;
enabling the first supply rail to source current into a merged supply rail;
generating a notification indicating a current provided by the at least one of the merged supply rail, the first supply rail, and the second supply rail exceeds a predefined maximum value; and
outputting the notification to a load circuit that is coupled to the merged supply rail.

21. A system, comprising:
a multi-output power supply circuit configured to provide two or more supply rails;
a load circuit configured to receive electrical energy through a merged supply rail; and
a rail merge circuit, configured to:
receive two or more current measurement signals that are associated with the two or more supply rails;
compute a difference signal for each supply rail as a difference between the current measurement signal and an average signal value of the two or more current measurement signals;

select a first supply rail of the two or more supply rails, the first supply rail having a maximum value of the difference signals;
enable the first supply rail to source current into a merged supply rail;
generate a notification indicating a current provided by the at least one of the merged supply rail, the first supply rail, and the second supply rail exceeds a predefined maximum value; and
output the notification to the load circuit that is coupled to the merged supply rail.

* * * * *